June 11, 1968 J. BRÜDERLEIN 3,387,499
MECHANICAL VIBRATOR WITH ELECTROMAGNETIC DAMPING MEANS
Filed Aug. 27, 1965

Inventor:
Johannes Brüderlein
By: Spencer & Kaye
Attorneys

United States Patent Office 3,387,499
Patented June 11, 1968

3,387,499
MECHANICAL VIBRATOR WITH ELECTRO-
MAGNETIC DAMPING MEANS
Johannes Brüderlein, Rheinhausen, Germany, assignor
to Beteiligungs- und Patentverwaltungsgesellschaft mit
beschrankter Haftung, Esssen, Germany
Filed Aug. 27, 1965, Ser. No. 483,181
Claims priority, application Germany, Sept. 2, 1964,
B 78,363
13 Claims. (Cl. 74—61)

ABSTRACT OF THE DISCLOSURE

A resonant vibrator having a vibratory mass arranged to oscillate at a substantially constant frequency and at an amplitude which can be varied over a wide range by electric eddy current damping means associated with the mass for producing eddy currents which act to damp the amplitude of such oscillation.

---

The present invention relates to electrical devices, and more particularly, to resonant vibrators whose amplitude of vibration is controlled by the action of adjustable vibration damping means.

As is known in the art, the amplitude of vibration of electromagnetically driven resonant vibrators can be regulated by controlling the degree of excitation applied thereto. However, such arrangements are generally useable only for relatively small vibratory masses having high resonant frequencies corresponding to the power line frequencies of 50 to 60 c.p.s.

In the case of resonant vibrators having larger vibratory masses which are driven mechanically by unbalanced masses, for example, it has been the practice to regulate the amplitude of vibrations by means of vibratory dampers. The heretofore used liquid or friction dampers have not proved to be wholly satisfactory, however, because they allow the amplitude of vibration to be varied only within a small range and their structure is quite complicated.

It is, therefore, a primary object of the present invention to overcome these drawbacks of the prior art.

It is a more specific object of the present invention to regulate the movement of a resonant vibrator over a wide amplitude range.

Yet another object of the present invention is to regulate the amplitude of vibration of a resonant vibrator over a range which extends down to an amplitude of zero.

Still another object of the present invention is to regulate the amplitude of vibration of a resonant vibrator through the use of a damping device of simple structure.

A yet further object of the present invention is to eliminate the need for liquid or friction vibration dampers.

According to the present invention, the above objects are achieved through the use of an electric eddy current damper as the damping device, the damping eddy currents being produced, for example, in a copper plate which is secured to the vibratory mass, which copper plate moves in a stationary magnetic field or in a magnetic field which moves with a counter-vibrating mass. The stronger the magnetic field, the larger will be the eddy currents acting to damp the mechanically produced vibrations, and the greater will be the reduction in the amplitude of these vibrations. The magnetic field can be generated, for example, by means of an electromagnet having a controllable D.C. excitation, the amplitude of which can be regulated by a suitable control circuit.

Figure 1:
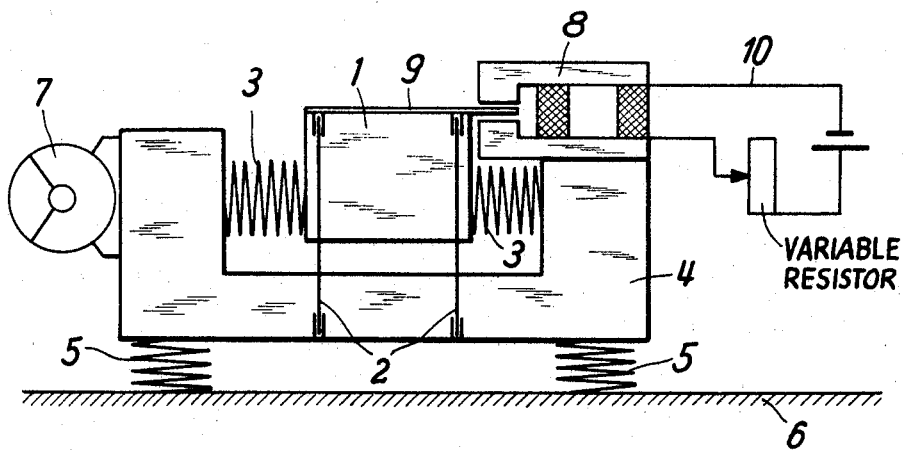
Figure 2:
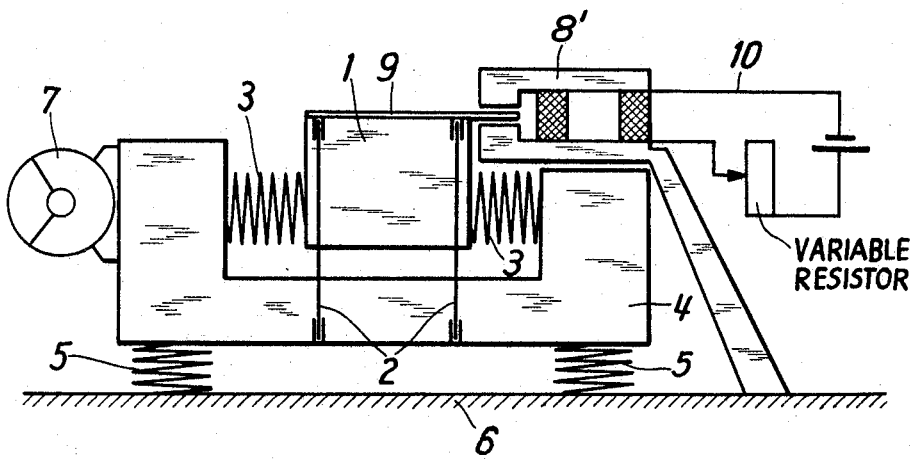

Additional objects and advantages of the present invention will become apparent upon consideration of the following description when taken in conjunction with the accompanying drawings in which:

FIGURE 1 is a pictorial side view of a preferred embodiment of the present invention; and FIGURE 2 is a similar view of a second embodiment of this invention.

FIGURE 1 shows a vibrator of the type incorporating two mutually opposed vibratory, or oscillatory, masses. This vibrator comprises a working mass 1 which may be constituted, for example, by a vibratory conveyor chute or trough, this working mass being mounted, in a standard manner, or at least one counter-vibratory mass 4 through the intermediary of vertically oriented control leaf springs 2 and energy storing coil springs 3. The counter-vibratory mass 4 is mounted on a base 6 through the intermediary of insulating coil springs 5 and is driven by an unbalanced mass 7 in such a way as to cause the working mass 1 to experience horizontal vibrations, or oscillations, in the range of its resonant frequency. The manner in which the rotation of unbalanced mass 7 induces horizontal vibrations in working mass 1 is well known and will not be described in detail here. The specific expression defining the motion of a mass 1 in a particular embodiment of the invention can be readily determined by a straightforward development of the classic equations of dynamics relating to the motion of spring-supported bodies subjected to an oscillatory impulsion. These equations will also readily reveal that the horizontal vibratory motion of mass 1 is out of phase with that of mass 4 so that a relative horizontal motion exists between masses 1 and 4.

Rigidly connected to the counter-vibratory mass 4 is a direct current excited electromagnet 8 whose exciting coil is fed by an excitation current circuit 10, the output current amplitude of which is variable. Electromagnet 8 also has an air gap within which is disposed one end of a copper plate 9 which is rigidly connected to the working mass 1 for movement therewith. With such an arrangement, the copper plate 9 oscillates horizontally with respect to the air gap at the frequency and amplitude of the relative oscillation existing between the masses 1 and 4. With the exciter unbalanced mass 7 being driven at a constant rotational speed, the amplitude of this relative oscillation can be varied, within any desired range, merely by varying the amplitude of the current supplied by circuit 10, which current variation serves to vary the damping effect produced on copper plate 9 by the mangetic field in the air gap of electromagnet 8.

FIGURE 2 shows a device which is identical with that of FIGURE 1 with the exception that the electromagnet 8′ is rigidly mounted on base 6, rather than on mass 4. With this arrangement, the magnet 8′ will remain stationary and will thus be able to control the amplitude of oscillation of mass 1 independently of the behavior of mass 4. Thus, this arrangement readily permits the amplitude of vibration of the mass 1 to be varied over a range which extends down to zero amplitude.

It will be understood that the above description of the present invention is susceptible to various modifications, changes, and adaptations, and the same are intended to be comprehended within the meaning and range of equivalents of the appended claims.

What is claimed is:

1. A resonant vibrator the vibration frequency of which is substantially constant and the amplitude of vibration of which can be regulated over a wide range, comprising, in combination:

(a) a vibratory mass mounted for oscillation;

(b) vibration-inducing means operatively associated with said mass for oscillating the same; and (c) controllable electric eddy current damping means associated with said mass for producing eddy currents which act to damp the amplitude of said oscillation.

2. An arrangement as defined in claim 1 wherein said vibration-inducing means are of the mechanical type.

3. An arrangement as defined in claim 2 wherein said vibration-inducing means are constituted by a rotary unbalanced mass.

4. An arrangement as defined in claim 1 further comprising control means connected to said eddy current damping means for varying the amplitude of the eddy currents produced thereby independently of the amplitude of said oscillation.

5. A device as recited in claim 1 wherein said electric eddy current damping means comprise:
   (1) magnetic field producing means mounted for relative motion with respect to said mass; and
   (2) electrically conductive means connected to said mass for movement therewith positioned to extend at least partially into said magnetic field.

6. A device as recited in claim 5 wherein said electrically conductive means is constituted by a copper plate.

7. A device as recited in claim 5 wherein said eddy current damping means further comprise independent control means connected to said magnetic field means for adjusting the amplitude of said field.

8. A device as recited in claim 5 wherein said magnetic field producing means are mounted on a stationary support.

9. A device as recited in claim 5 wherein said magnetic field producing means is constituted by an electromagnet having an air gap into which extends said current conducting means.

10. A resonant vibrator the amplitude of the vibrations of which can be regulated over a wide range, comprising, in combination:
    (a) a vibratory mass mounted for oscillation;
    (b) vibration-inducing means operatively associated with said mass for oscillating the same;
    (c) a counter-vibratory mass upon which said vibratory mass is mounted for vibration with respect thereto;
    (d) electric eddy current damping means associated with said mass for producing eddy currents which act to damp the amplitude of said oscillation, said eddy current damping means including magnetic field producing means mounted for relative motion with respect to said mass, and electrically conductive means connected to said mass for movement therewith and positioned to extend at least partially into said magnetic field.

11. A device as recited in claim 10 wherein said magnetic field producing means are mounted on one of said masses and said electrically conductive means are mounted on the other of said masses.

12. A device as recited in claim 10 wherein said magnetic field producing means are mounted on said vibratory mass and said electrically conductive means are mounted on said counter-vibratory mass.

13. A resonance vibrator the amplitude of vibration of which can be regulated over a wide range, comprising, in combination:
    (a) vibratory mass mounted for oscillation;
    (b) vibration-inducing means operatively associated with said mass for oscillating the same; and
    (c) electric eddy current damping means associated with said mass for producing eddy currents which act to damp the amplitude of said oscillation, said eddy current damping means including magnetic field producing means mounted for relative motion with respect to said mass and constituted by an electromagnet having an air gap, electrically conductive means connected to said mass for movement therewith and positioned to extend into said air gap so as to be at least partially subjected to the magnetic field of said producing means, and independent control means comprising an adjustable current source connected to said magnetic field producing means for adjusting the amplitude of the magnetic field produced thereby.

References Cited
UNITED STATES PATENTS

| | | | |
|---|---|---|---|
| 2,810,842 | 10/1957 | Lewis | 310—27 |
| 2,708,737 | 5/1955 | Skidmore | 310—93 XR |
| 2,636,095 | 4/1953 | Schulte. | |
| 1,864,214 | 6/1932 | Petty. | |

FOREIGN PATENTS 849,251  7/1952  Germany.

MILTON O. HIRSHFIELD, *Primary Examiner.*

D. F. DUGGAN, *Assistant Examiner.*